(12) United States Patent
Lancia

(10) Patent No.: US 11,682,211 B2
(45) Date of Patent: Jun. 20, 2023

(54) COMPUTER-IMPLEMENTED METHOD

(71) Applicant: AVA VIDEO SECURITY LIMITED, Uxbridge (GB)

(72) Inventor: Samuel Lancia, Uxbridge (GB)

(73) Assignee: AVA VIDEO SECURITY LIMITED, Uxbridge (GB)

( * ) Notice: Subject to any disclaimer, the term of this patent is extended or adjusted under 35 U.S.C. 154(b) by 0 days.

(21) Appl. No.: 16/921,284

(22) Filed: Jul. 6, 2020

(65) Prior Publication Data

US 2021/0004601 A1 Jan. 7, 2021

(30) Foreign Application Priority Data

Jul. 5, 2019 (GB) ..................................... 1909693

(51) Int. Cl.
*G06V 20/40* (2022.01)
*G06T 7/70* (2017.01)
*G06T 7/20* (2017.01)
*H04N 5/92* (2006.01)
*G06F 18/214* (2023.01)
*G06F 18/21* (2023.01)
*G06V 20/52* (2022.01)
*G06V 10/62* (2022.01)

(52) U.S. Cl.
CPC ............ *G06V 20/48* (2022.01); *G06F 18/214* (2023.01); *G06F 18/217* (2023.01); *G06T 7/20* (2013.01); *G06T 7/70* (2017.01); *G06V 20/41* (2022.01); *G06V 20/52* (2022.01); *H04N 5/9201* (2013.01); *G06T 2207/10016* (2013.01); *G06T 2207/20081* (2013.01); *G06V 10/62* (2022.01)

(58) Field of Classification Search
None
See application file for complete search history.

(56) References Cited

U.S. PATENT DOCUMENTS

| | | | |
|---|---|---|---|
| 9,612,123 B1 * | 4/2017 | Levinson | G01S 17/875 |
| 10,217,028 B1 * | 2/2019 | Wang | G06V 20/54 |
| 10,600,157 B2 * | 3/2020 | Shoa Hassani Lashdan | H04N 5/2621 |
| 2015/0178953 A1 * | 6/2015 | Gao | G06F 3/04842 345/681 |
| 2016/0148054 A1 | 5/2016 | Han et al. | |
| 2017/0168709 A1 | 6/2017 | Zhong et al. | |
| 2018/0341813 A1 | 11/2018 | Chen et al. | |

FOREIGN PATENT DOCUMENTS

EP 1988488 A1 11/2008

OTHER PUBLICATIONS

Combined Search and Examination Report from GB Intellectual Property Office, dated Dec. 20, 2019 in GB 1909693.2.
Application No. EP 20 18 4073, extended European Search Report dated Nov. 23, 2020, 8 pages.

* cited by examiner

Primary Examiner — Vikkram Bali

(57) ABSTRACT

A computer-implemented method of identifying an object within a video stream from a camera, and determining the consistency with which the object is identified within plural temporally spaced video frames of the video stream.

15 Claims, 3 Drawing Sheets

| Source | Timestamp | Object Type | Location |
|---|---|---|---|
| 1 | 2018-01-01:12.00.00 | Car | ----- |
| 1 | 2018-01-01:12.00.05 | Car | ----- |
| 1 | 2018-01-01:12.00.10 | Car | ----- |

Fig. 5A

| Source | Timestamp | Object Type | Location |
|---|---|---|---|
| 2 | 2018-01-01:12.00.00 | Car | ----- |
| 2 | 2018-01-01:12.00.05 | Car | ----- |
| 2 | 2018-01-01:12.00.10 | Car | ----- |

Fig. 5B

COMPUTER-IMPLEMENTED METHOD

CROSS-REFERENCE TO RELATED APPLICATION

This application claims priority to Great Britain Application No. 1909693.2, filed Jul. 5, 2019, which is hereby incorporated by reference in its entirety for all purposes.

FIELD OF THE INVENTION

The present invention relates to a computer-implemented method of identifying an object within a video stream received from a camera, and determining the consistency with which the object is identified within plural temporally spaced video frames of the video stream.

BACKGROUND

It is useful, in the context of security camera systems, to automatically identify objects in live video streams, and to re-identify those objects either within separate frames of one video stream or between the video streams of multiple cameras. This requires the ability to carry out object analysis at an appropriate rate, as if the analysis is too slow the latency on viewing an analysed video stream may be too long. Further, plainly, if a system is analysing media streams from a plurality of sources then the aggregate rate across all of these sources is important.

Machine learning models are generally used to automatically identify and re-identify objects in a video stream, and form a key component of any object analysis. Due to the required rate discussed above, these machine learning models should be able to perform fast analytics but not at the expense of being inaccurate. Typically, the most accurate models are not suitable for real time analytics due to the time required to analyse each video frame.

Further, to usefully implement a machine learning model, it must be trained using a dataset. The dataset would typically contain multiple images within video frames, along with a list of objects within each image and their coordinates (positional). An unlabelled image is provided to the machine learning algorithm, which attempts to classify and label the object. Once it has done this, the label is compared to the known label of the object so as to determine whether the machine learning algorithm correctly identified the object.

Re-identification datasets contain multiple images of the same object, amongst images of multiple objects. An image is provided to the machine learning algorithm, which attempts to find the other images corresponding to the same object. Once this is done, the labels of the provided image and found images are compared to ascertain accuracy.

It is useful for each image within these datasets to be sufficient different from the others, as this can allow the dataset to cover the training space most efficiently. When many points in the dataset are similar, this repetition can slow down the training process without improving accuracy.

The accuracy of the model, once trained using the dataset, is determined based on how many of the known objects it finds, including correctly classifying the object, as well as how many it missed or misclassified or any objects it found that weren't actually present.

In order to improve the accuracy of the model, it is necessary to have large training datasets. Whilst the dataset only needs to be built once, creating large accurate datasets is a problem.

Two known methods include:
(1) Manual labelling—this is time consuming, as each image needs be viewed and labelled as required;
(2) Automatic labelling—this uses a slow, very accurate, object detector to automatically label data. This data is then used to train a smaller/faster model. However, any errors in the automatic labelling will cause models to be fitted to incorrectly labelled data.

A combination of (1) and (2) is also known, where an operator manually verifies the automatically generated labels.

The invention has been derived in light of the above considerations.

SUMMARY

In a first aspect, embodiments of the invention provide a computer-implemented method of identifying an object within a video stream from a camera, and determining the consistency with which the object is identified within plural temporally spaced video frames of the video stream, the method comprising:
  receiving a first video frame of the plural video frames at a first time;
  identifying an object within the first video frame, and labelling the object;
  storing the label of the object, together with the position of the object within the first video frame;
  receiving a second video frame of the plural video frames corresponding to a second time, temporally different from the first time;
  identifying an object within the second video frame, and labelling the object, wherein the object in the second video frame is the same as the object in the first video frame;
  deriving a motion vector between the first video frame and the second video frame, using the position of the object in the first frame and the position of the object in the second frame; and
  determining a consistency with which the object in the first video frame and the object in the second video frame have been identified, using the derived cumulative motion vector.

Such a method allows more accurate identification of objects within a video stream, and allows a dataset to be generated which can be used in training a machine learning based object classifier.

The computer-implemented method may have any one or, to the extent that they are compatible, any combination of the following optional features.

The object as identified in the second video frame may have generally the same location as the object identified and labelled in the first video frame. Deriving the cumulative motion vector may be achieved using the position of the object in the first frame and the position of the object in the second frame having the same label as the object in the first frame. The second frame may be temporally after the first frame. The motion vector may be a cumulative motion vector.

Identifying the object within the first and/or second video frame may be performed via an object classifier algorithm.

The camera may be a first camera, and the method may further comprise the steps of:
  receiving a comparator video frame from a second video stream of a second camera, said second video stream having a field of view at least partially overlapping with a field of view of the video stream of the first camera, the comparator video frame corresponding to the first time:
    identifying an object within the comparator video frame; and
    determining whether the object present in the overlapping fields of view are consistently labelled between the first video frame and the comparator video frame.

The method may include a step of storing one or both of the first video frame and the second video frame, with data indicative of the labelled object, when it is determined that the object has been identified consistently between the first video frame and the second video frame.

The method may include a step of storing one or both of the first video frame and the second video frame, with data indicative of the labelled object, when it is determined that a difference between the first video frame and the second video frame exceeds a threshold and when it has been determined that the object has been identified consistently between the first video frame and the second video frame. The difference between the frames may be ascertained from the use of decoded macroblock information. The threshold may be based on the temporal and/or spatial differences between the identification of the object, or by the changes to the pixel values.

The method may be repeated, so as to build a training dataset formed of stored video frames.

In a second aspect, embodiments of the invention provide a computer-implemented method of training a machine learning based object classifier to identify or re-identify objects in a video stream, which uses the training dataset formed according to the first aspect.

In a third aspect, embodiments of the invention provide a system, including a processor, wherein the processor is configured to:
    receive a first video frame of a video stream, the video stream including plural temporally spaced video frames, the first video frame corresponding to a first time;
    identify an object within the first video frame, and label the object;
    store the label of the object, together with the position of the object within the first video frame;
    receive a second video frame of the plural video frames, corresponding to a second time, temporally different from the first time;
    identify an object within the second video frame, and label the object, wherein the object in the second video frame is the same as the object in the first video frame;
    derive a motion vector between the first video frame and the second video frame, using the position of the object in the first frame and the position of the object in the second frame; and
    determine a consistency with which the object in the first video frame and the object in the second video frame have been identified, using the derived cumulative motion vector.

The system may have any one or, to the extent that they are compatible, any combination of the following optional features.

The object as identified in the second video frame may have generally the same location as the object identified and labelled in the first video frame. Deriving the cumulative motion vector may be achieved using the position of the object in the first frame and the position of the object in the second frame having the same label as the object in the first frame. The second frame may be temporally after the first frame. The motion vector may be a cumulative motion vector.

The processor may be configured to identify the object within the first and/or second frame via an object classifier algorithm.

The system may include a storage medium, and the processor may be configured to receive the first and second frames of the video stream from the storage medium. A video camera may capture a video stream, and store it in the storage medium. This video stream can then be subject to processing by the processor.

The system may include a camera, and the processor may be configured to directly receive the first and second frames of the video stream from the camera. The camera may be a first camera, and the system may include a second camera, and the processor may be configured to:
    receive a comparator video frame from a second video stream of the second camera, said second video stream having a field of view which at least partially overlaps with a field of view of the first video stream of the first camera, the comparator video frame corresponding to the first time;
    identify an object within the comparator video frame; and
    determine whether the object present in the overlapping fields of view are consistently labelled between the first video frame and the comparator video frame.

The system may include a storage medium, and the processor may be configured to store one or both of the first video frame and the second video frame in the storage medium, with data indicative of the labelled object, when the processor determines that the object has been identified consistently between the first video frame and the second video frame.

The system may include a storage medium, and the processor may be configured to store one or both of the first video frame and the second video frame in the storage medium, with data indicative of the labelled object, when the processor determines that a difference between the first video frame and the second video frame exceeds a threshold and when the processor determines that the object has been identified consistently between the first video frame and thee second video frame.

The processor may be configured to repeat the steps so as to build a training dataset of stored video frame.

Further aspects of the present invention provide: a computer program comprising code which, when run on a computer, causes the computer to perform the method of the first aspect or second; a computer readable medium storing a computer program comprising code which, when run on a computer, causes the computer to perform the method of the first or second aspect; and a computer system programmed to perform the method of the first or second aspect.

BRIEF DESCRIPTION OF THE DRAWINGS

Embodiments of the invention will now be described by way of example with reference to the accompanying drawings in which:
FIGS. 5A and 5B are tables showing the objects identified in the video streams from the two-camera setup of FIG. 4.

DETAILED DESCRIPTION AND FURTHER OPTIONAL FEATURES

Figure 1:
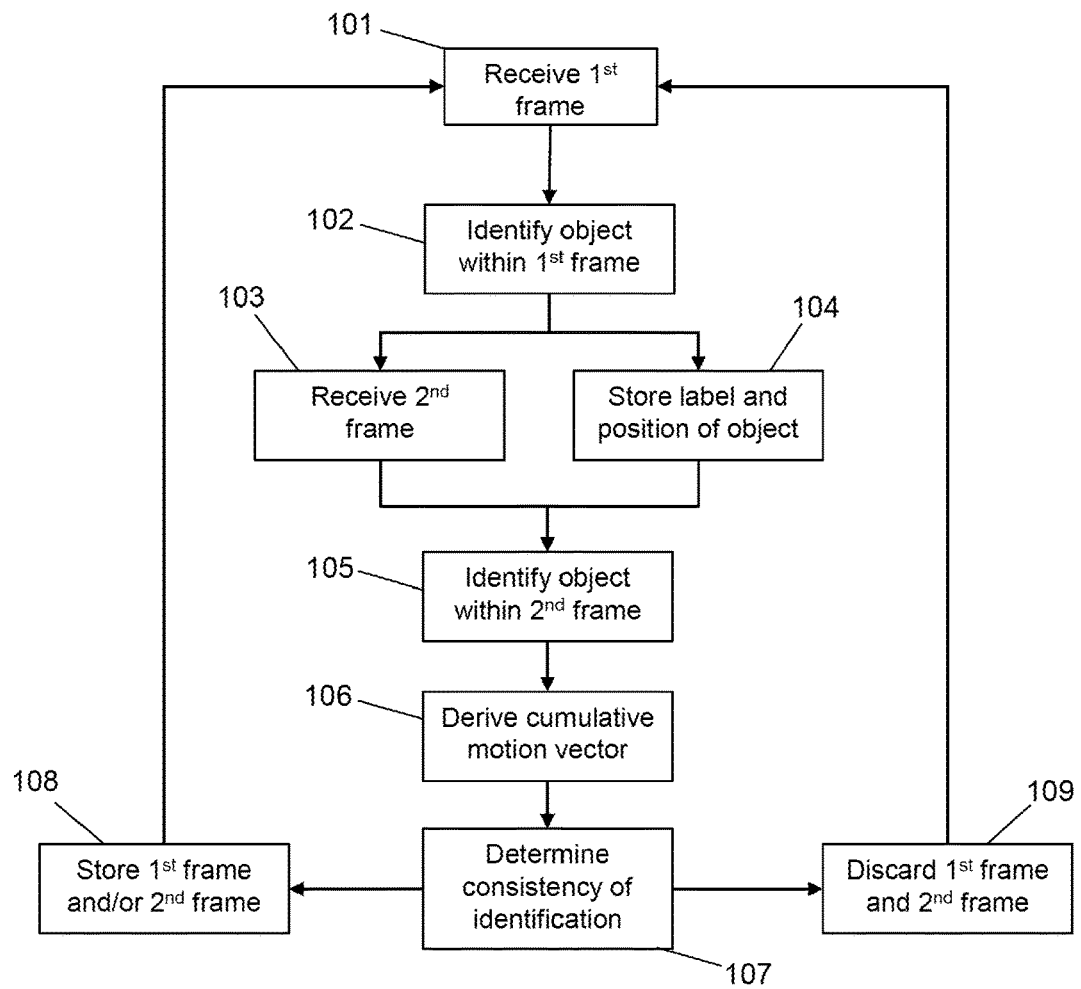
FIG. 1 shows a flow diagram of an embodiment of the present invention.

Aspects and embodiments of the present invention will now be discussed with reference to the accompanying figures. Further aspects and embodiments will be apparent to those skilled in the art. All documents mentioned in this text are incorporated herein by reference FIG. 1 shows a flowchart of a method according to an embodiment of the present invention. In a first step 101, a first video frame is loaded from a video stream obtained either from a camera or a file within a storage medium. Next, in step 102, an object within the first frame is identified and labelled. This identification can be performed by use of an object classification algorithm, for example a k-nearest neighbour algorithm, decision tree, or neural network.

Once the object has been identified, a second frame is received in step 103 and either before this step or in parallel thereto, the label and position of the object as detected in the first frame is stored in step 104. Subsequently in step 105, after the $2^{nd}$ frame has been identified in step 103, an object is identified within the $2^{nd}$ frame.

Once an object in the first frame and the second frame have been identified, the method moves to step 106 where a cumulative motion vector is determined using the first frame and the second frame. Specifically, the cumulative motion vector is determined using the position of the object in the first frame and the position of the object in the second frame. A cumulative motion vector is constructed from the motion vectors contained within each frame. For each part of the image, the motion vectors from each intermediate frame are summed to provide a motion vector between the two frames. This summation can be done as each frame is processed, or done for multiple frames.

After step 106, a determination is made in step 107, as to whether the objects have been consistently identified between the first and second frames, using the derived cumulative motion vector. The objects are known in principle to be the same object through interrogation of the derived cumulative motion vector. If the determination is that they have been consistently identified between the first and second frames, the first and/or second frames maybe stored in step 108 in a database in order to build a training dataset. The method then returns to step 101 and a new first frame is received from the video stream. Alternatively, if the determination is that the object was not consistently identified between the first and second frames, the first and second frame can be discarded and the method returns to step 101.

In addition to the determination that the object was consistently identified between the frames, embodiments of the invention may also determine whether a difference between the first video frame and the second video frame exceeds a threshold. If it does, i.e. if the two frames are sufficiently different, only in that instance might one or both of the frames be saved for used in the training set. Typically if the frames are not sufficiently different only the first frame will be retained, and the second frame would be discarded. In that scenario, the method may return to step 103 and a new second frame may be acquired. Alternatively, if the frames are sufficiently different the first frame may be stored and second frame may become the new 'first' frame in that the method returns to step 103 and a new 'second' frame is obtained. This can ensure that the dataset is populated with meaningfully different images for use in training the machine learning based object classifier.

Figure 2:
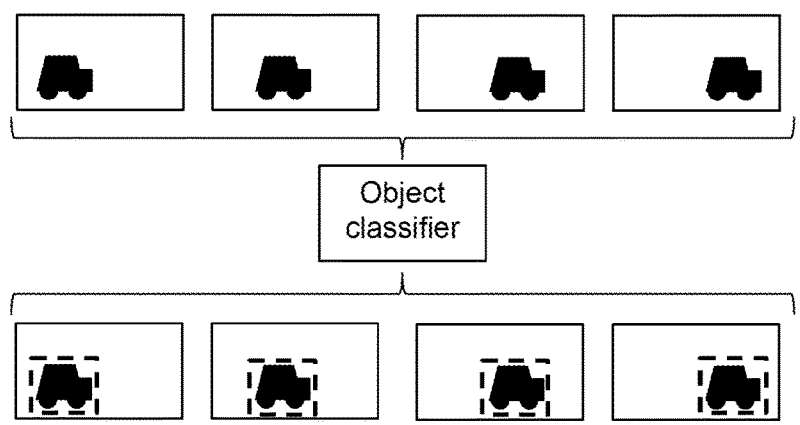
FIG. 2 is a schematic showing the method of the present invention in operation over plural temporally spaced frames.

FIG. 2 is a schematic showing the method of the present invention in operation over plural temporally spaced frames. The frames progress in time from left to right, with the leftmost being the earliest and the rightmost being the latest. An object, in this instance a car, passes from the left hand side of the frame to the right hand side of the frame. Each frame is provided to an object classifier, which identifies the object and provides a boundary box around it as shown.

Figure 3:
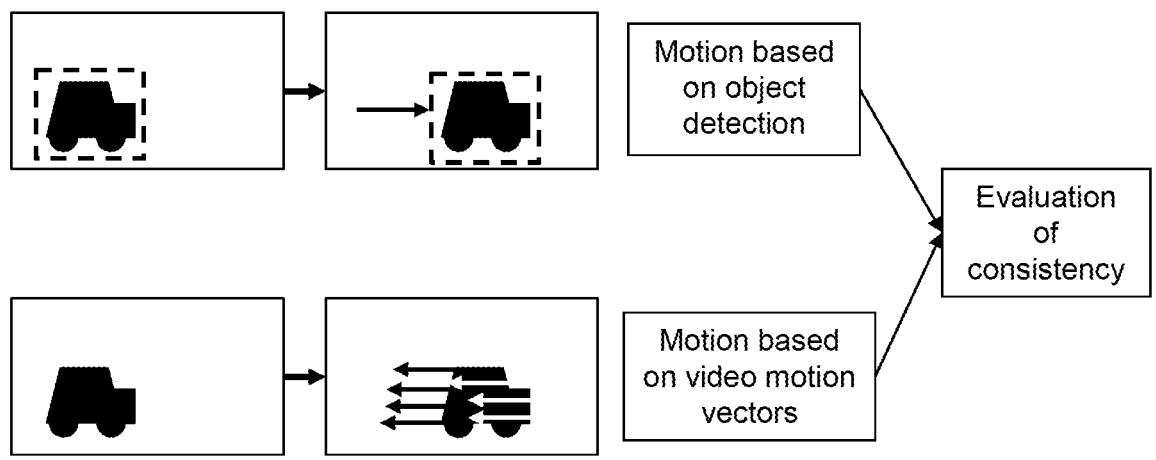
FIG. 3 is a schematic illustrating the determination of consistency with which objects are identified.

FIG. 3 is a schematic illustrating the determination of consistency with which objects identified. The upper two frames are a first frame (on the left) and a second frame (on the right) respectively. The object in each frame has been identified as discussed previously, with a boundary box being provided. The motion of the object as identified in each frame can be determined by looking at the different positions of the boundary box. Separately, in a process which may occur in parallel or subsequently to the object detection or identification process, a cumulative motion vector is determined between the first frame and the second frame. This can be done by utilising motion vectors in the video Accordingly, after both processes, a motion based on the object detection or identification process and a motion based on the video motion vector has been derived. These can then be passed to a module or process for evaluating the consistency with which the object was identified. The derivation of the motion based on the object detection is optional, and instead the consistency process may, as discussed previously, identify whether an object in the first and second frames which is known to be the same object (via the cumulative motion vector) has been labelled with the same label by the object detection or identification process.

Figure 4:
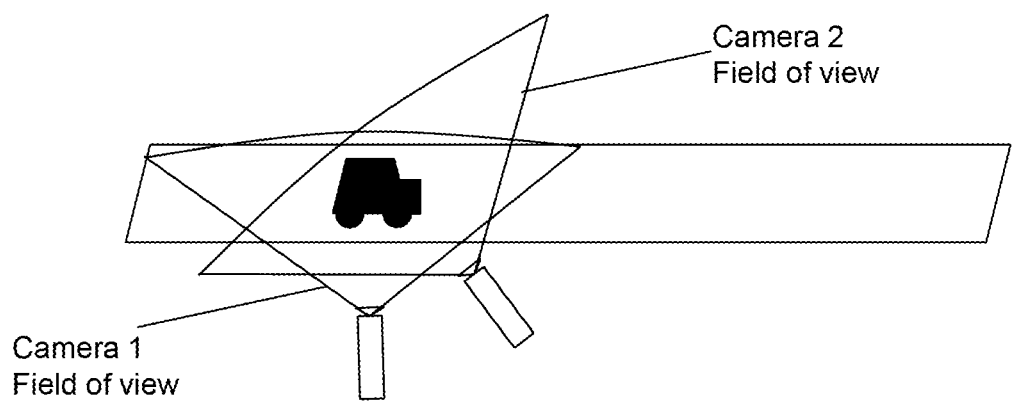
FIG. 4 is a schematic of a two-camera setup according to the present invention.

FIG. 4 shows a schematic of a two-camera setup according to the present invention. Using such a setup, the method discussed previously can be augmented. In addition to the previous steps, a comparator video frame may be received from a second camera (Camera 2) which has a field of view which at least partially overlaps the field of view of the first camera discussed previously (Camera 1). An object is then identified in the comparator video frame, and a determination is made as to whether the object present in the overlapping fields of view (between Camera 1 and Camera 2) was consistently labelled between the first video frame and the comparator video frame.

FIGS. 5A and 5B are tables showing the objects identified in the video streams from the two-camera setup on FIG. 4. As can be seen, at each of the three entries (each entry corresponding to a different time), the object was identified as a car in all of the frames of each camera. Accordingly, the object was consistently identified by the object classifier.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A computer-implemented method of identifying an object within a video stream collected by a camera, and making a consistency determination with which the object is identified within plural temporally spaced video frames of the video stream, the computer-implemented method comprising:

receiving a first video frame of the plural video frames at a first time;

identifying and classifying the object within the first video frame via an object classifier algorithm;

labelling the object with a classifier label based on the classification of the object identified by the object classifier algorithm;

storing the classifier label of the object in association with an identifier of a first position of the object within the first video frame;

receiving a second video frame of the plural video frames corresponding to a second time, temporally different from the first time;

re-identifying and classifying the object within the second video frame via the object classifier algorithm;

labelling the object with the classifier label based on the classification of the object identified by the object classifier algorithm, wherein the object in the second video frame is classified as the same as the object in the first video frame;

deriving a cumulative motion vector between the first video frame and the second video frame, using the first position of the object in the first frame and a second position of the object in the second frame having the same classifier label as the object in the first frame; and determining a consistency with which the object identified and classified in the first video frame and the object re-identified and classified in the second video frame have been identified, using the derived cumulative motion vector.

2. The computer-implemented method of claim 1, wherein the camera is a first camera, and the method further comprises the steps of:

receiving a comparator video frame from a second video stream of a second camera, said second video stream having a field of view at least partially overlapping with a field of view of the video stream of the first camera, the comparator video frame corresponding to the first time;

identifying an object within the comparator video frame; and determining whether the object present in the overlapping fields of view are consistently labelled between the first video frame and the comparator video frame.

3. The computer-implemented method of claim 1, including a step of storing one or both of the first video frame and the second video frame, with data indicative of the labelled object, when it is determined that the object has been identified consistently between the first video frame and the second video frame.

4. The computer-implemented method of claim 3, wherein the method is repeated so as to build a training dataset formed of stored video frames.

5. A computer-implemented method of training a machine learning based object classifier, using the dataset according to the method of claim 4.

6. The computer-implemented method of claim 1, further comprising a step of storing one or both of the first video frame and the second video frame, with data indicative of the labelled object, when it is determined that a difference between the first video frame and the second video frame exceeds a threshold and when it has been determined that the object has been identified consistently between the first video frame and the second video frame.

7. The computer-implemented method of claim 1, further comprising a step of determining, as a result of a difference between the first video frame and the second video frame exceeding a threshold, that both of the first video frame and the second video frame will be stored, with respective data indicative of the labelled object.

8. The computer-implemented method of claim 1, wherein the re-identifying of the object and the deriving of the cumulative motion vector are carried out in parallel.

9. A system, including a processor, wherein the processor is configured to:

receive a first video frame of a video stream, the video stream including plural temporally spaced video frames, the first video frame corresponding to a first time;

identify and classify an object within the first video frame via an object classifier algorithm;

label the object with a classifier label based on the classification of the object identified by the object classifier algorithm;

store the classifier label of the object, together with a first position of the object within the first video frame;

receive a second video frame of the plural video frames, corresponding to a second time, temporally different from the first time;

re-identify and classify the object within the second video frame via the object classifier algorithm;

label the object with the classifier label based on the classification of the object identified by the object classifier algorithm, wherein the object in the second video frame is classified as the same as the object in the first video frame;

derive a cumulative motion vector between the first video frame and the second video frame, using the first position of the object in the first frame and a second position of the object in the second frame having the same classifier label as the object in the first frame; and determine a consistency with which the object identified and classified in the first video frame and the object re-identified and classified in the second video frame have been identified, using the derived cumulative motion vector.

10. The system of claim 9, wherein the camera is a first camera, and the system further includes a second camera, and the processor is configured to:

receive a comparator video frame from a second video stream of the second camera, said second video stream having a field of view which at least partially overlaps with a field of view of the first video stream of the first camera, the comparator video frame corresponding to the first time;

identify an object within the comparator video frame; and determine whether the object present in the overlapping fields of view are consistently labelled between the first video frame and the comparator video frame.

11. The system of claim 9, wherein the system includes a storage medium, and the processor is configured to store one or both of the first video frame and the second video frame in the storage medium, with data indicative of the labelled object, when the processor determines that the object has been identified consistently between the first video frame and the second video frame.

12. The system of claim 11, wherein the processor is configured to repeat the steps so as to build a training dataset of stored video frames.

13. The system of claim 9, wherein the system includes a storage medium, and the processor is configured to store one or both of the first video frame and the second video frame in the storage medium, with data indicative of the labelled object, when the processor determines that a difference between the first video frame and the second video frame exceeds a threshold and when the processor determines that the object has been identified consistently between the first video frame and the second video frame.

14. The system of claim 9, wherein when a difference between the first video frame and the second video frame exceeds a threshold, the processor is configured to store both of the first video frame and the second video frame, with respective data indicative of the labelled object, instead of less than both the first video frame and the second video frame when the threshold is not exceeded.

15. The system of claim 9, wherein the processor is configured to carry out the re-identifying of the object and the deriving of the cumulative motion vector in parallel.

* * * * *